(12) United States Patent
Fujiwara et al.

(10) Patent No.: US 6,502,382 B1
(45) Date of Patent: Jan. 7, 2003

(54) EXPANDED GRAPHITE KNITTING YARN AND A GLAND PACKING

(75) Inventors: Masaru Fujiwara, Sanda (JP); Takahisa Ueda, Sanda (JP)

(73) Assignee: Nippon Pillar Packaging Co., Ltd., Osaka (JP)

(*) Notice: Subject to any disclaimer, the term of this patent is extended or adjusted under 35 U.S.C. 154(b) by 0 days.

(21) Appl. No.: 09/692,188

(22) Filed: Oct. 20, 2000

(30) Foreign Application Priority Data

Nov. 8, 1999 (JP) .......................................... 11-316517

(51) Int. Cl.[7] ................................................. D02G 3/36
(52) U.S. Cl. ........................................... 57/200; 57/210
(58) Field of Search ........................ 57/1 R, 3, 6, 200, 57/210

(56) References Cited

U.S. PATENT DOCUMENTS

| | | | | |
|---|---|---|---|---|
| 3,991,248 A | * | 11/1976 | Bauer ........................... | 428/245 |
| 5,198,063 A | * | 3/1993 | Howard et al. .............. | 156/282 |
| 5,225,262 A | * | 7/1993 | Leduc ........................... | 428/75 |
| 5,683,778 A | * | 11/1997 | Crosier ......................... | 428/59 |
| 6,027,809 A | * | 2/2000 | Ueda et al. .................. | 428/408 |

FOREIGN PATENT DOCUMENTS

GB 2243883 A * 11/1991

* cited by examiner

Primary Examiner—John J. Calvert
Assistant Examiner—Shaun R Hurley
(74) Attorney, Agent, or Firm—Jones, Tullar & Cooper, P.C.

(57) ABSTRACT

An expanded graphite knitting yarn according to the present invention is covered or bound and covered with a reinforcing material made of a braided body such as stainless steel line members, before an outer periphery of an expanded graphite tape having a predetermined width, which has been subjected to a twisting process, is braided. Therefore, an amount of the expanded graphite particles exfoliated from ends of the expanded graphite tape in the twisting process can be significantly reduced. Moreover, this can prevent the expanded graphite particles from being exfoliated from the end of the expanded graphite tape in a braiding process. Furthermore, the plural expanded graphite knitting yarns are put together and subjected to either braiding or twisting process, thereby forming a gland packing. This can enhance a sealing property and a pressure resistance property of the gland packing.

17 Claims, 5 Drawing Sheets

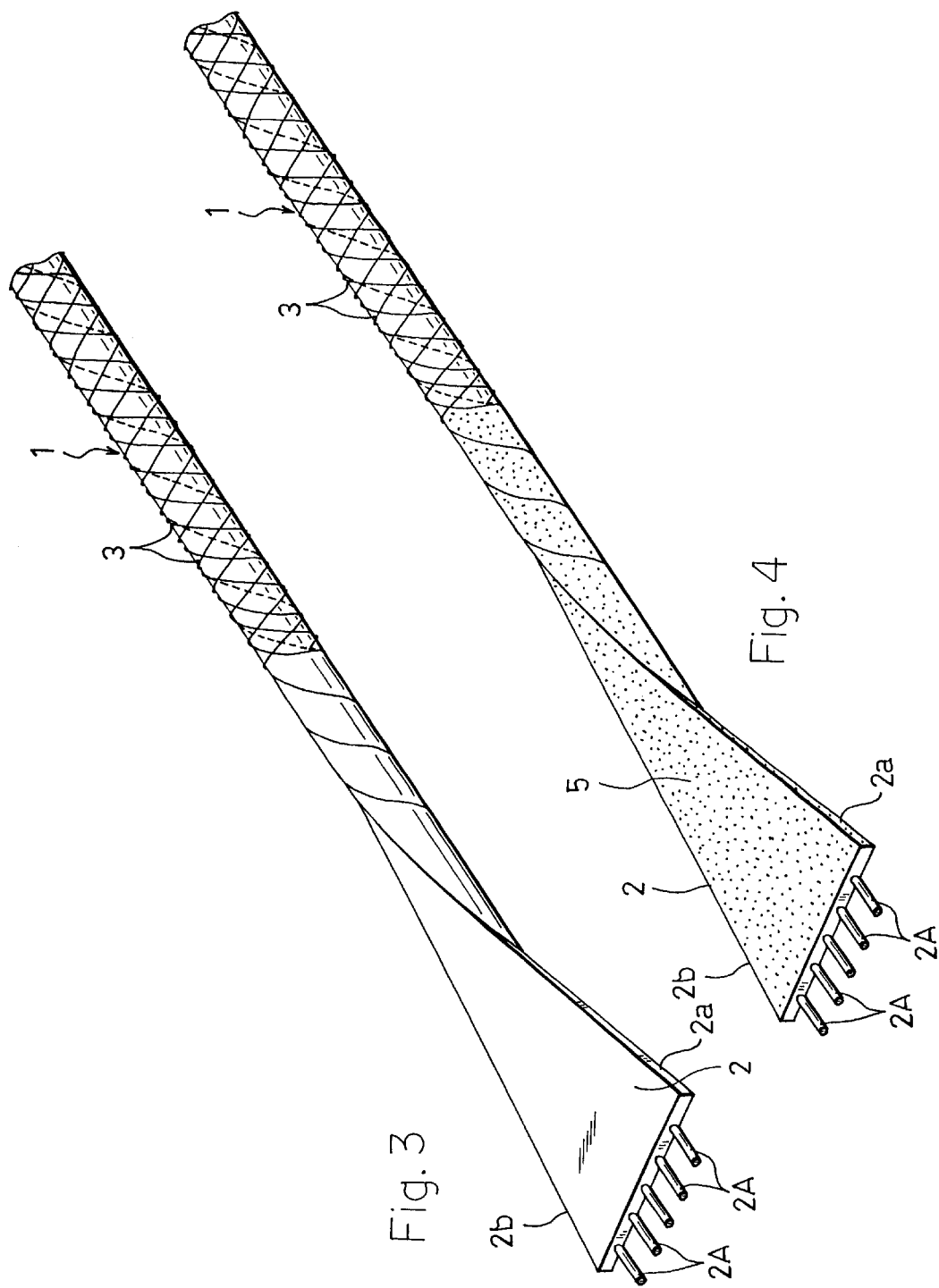

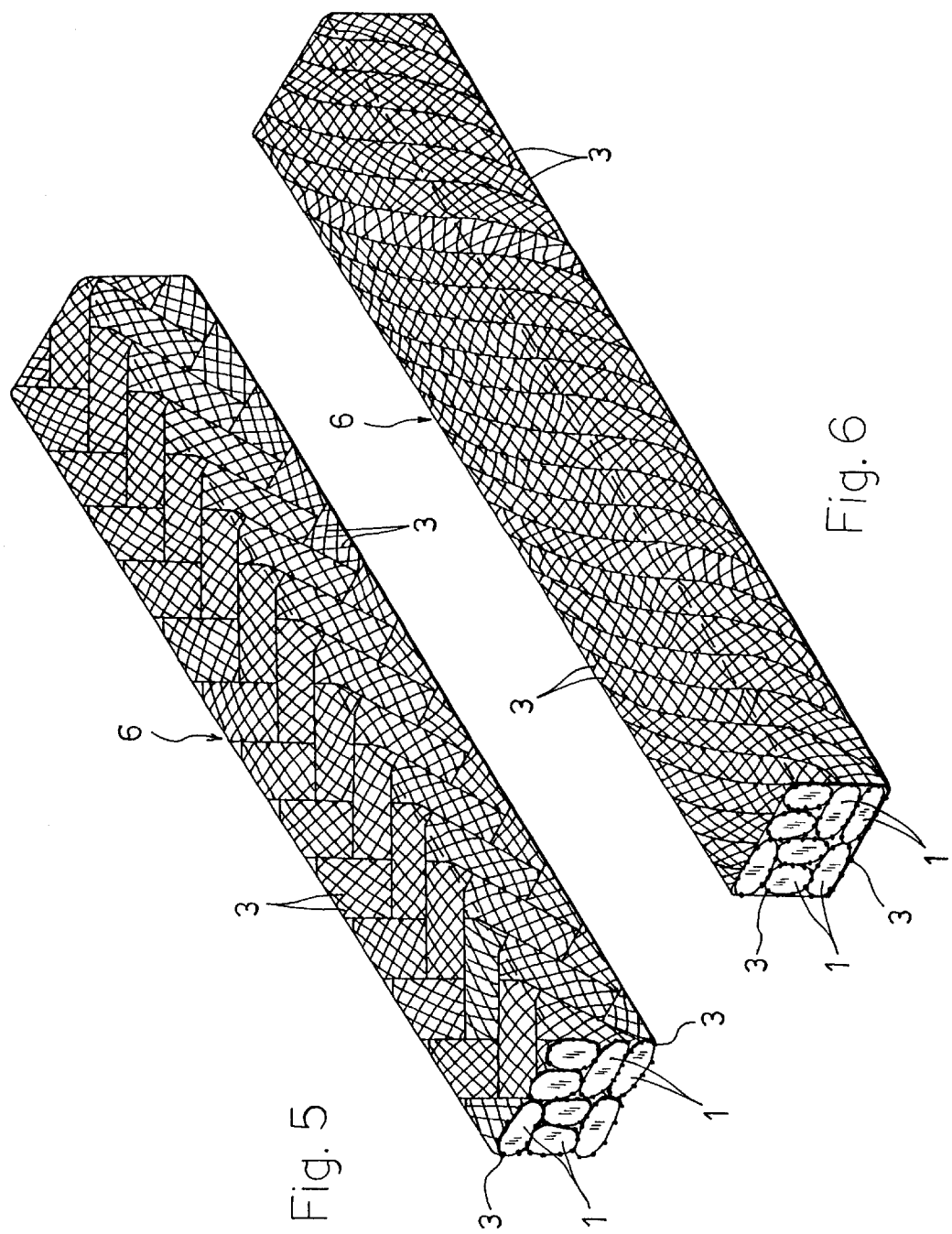

EXPANDED GRAPHITE KNITTING YARN AND A GLAND PACKING

BACKGROUND OF THE INVENTION

1. Field of the Invention

The present invention relates to a packing suitably used as an expanded graphite knitting yarn of a gland packing to be used at a shaft sealing portion in a fluid apparatus, and the gland packing made of the expanded graphite knitting yarns.

2. Description of the Prior Art

Conventionally, as a yarn of a gland packing used at a shaft sealing portion of a fluid apparatus, for example, a knitting yarn 1 shown in FIG. 7 has been known. As shown in FIG. 8, the knitting yarn 1 includes an expanded graphite tape 2 having a predetermined width, and plural reinforcing fibers 2A, the plural reinforcing fibers 2A are longitudinally embedded in the expanded graphite tape 2, at axial intervals, and the expanded graphite tape 2 is subjected to a twisting process shown in FIG. 7. Moreover, the plural knitting yarns 1 are put together and braided, thereby producing the gland packing.

However, the expanded graphite tape 2 as shown in FIG. 8 is poor in tensile strength and therefore fragile. Moreover, ends 2a, 2b on either side of the width direction are poor in exfoliation resistance property between expanded graphite particles. Therefore, when the expanded graphite tape 2 is subjected to the twisting process as shown in FIG. 8, cracks often occur from the ends 2a, 2b, whereby the many expanded graphite particles are exfoliated. If the knitting yarns 1, in which the many expanded graphite particles are exfoliated in the twisting process, are braided so as to produce the gland packing, the cracks often occur from the ends 2a, 2b of the expanded graphite tape 2, also in a braiding process. As a result of frequent occurrence of the cracks, more expanded graphite particles are exfoliated. Accordingly, a sealing property of the gland packing is worsened. In order to achieve an object of holding exfoliation of the expanded graphite particles to a minimum, it is impossible to braid it by means of a strong tensile force, whereby a pressure resistance property of the gland packing cannot be enhanced.

SUMMARY OF THE INVENTION

The present invention has been conducted in view of the above mentioned circumstances and problems. This can significantly reduce cracks occurring often from the ends in applying a twisting process to the expanded graphite tape, and the resultant exfoliation amount of the expanded graphite particles. It is an object to provide an expanded graphite knitting yarn which can prevent cracks and the resultant exfoliation of the expanded graphite particles, and a gland packing which can enhance a sealing property and a pressure resistance property by using the knitting yarns.

In order to attain the object, an expanded graphite knitting yarn relating to a first aspect of the present invention is formed by applying the twisting process to an expanded graphite tape, wherein an outer periphery of the expanded graphite tape which has been subjected to the twisting process is covered with a reinforcing material which is knitted or made of a braided body.

Moreover, an expanded graphite knitting yarn relating to a second aspect of the present invention is formed by applying the twisting process to an expanded graphite tape, wherein an outer periphery of the expanded graphite tape which has been subjected to the twisting process is bound and covered with a reinforcing material which is knitted or made of a braided body, before the tape is subjected to a braiding process.

According to the first aspect of the present invention having the above structure, the outer periphery of the expanded graphite tape which has been subjected to the twisting process, is covered with the reinforcing material which is knitted or made of a braided body. As a result, the reinforcing material can cope with a tensile force and a twisting force in the braiding process. As the twisting process of the expanded graphite tape, it is enough only to twist lightly the expanded graphite tape in order to prevent the cracks from occurring frequently from the ends thereof. Therefore, cracks which occur frequently from the ends of the expanded graphite tape in the twisting process, and the resultant exfoliation of the expanded graphite particles can be remarkably reduced. Moreover, the reinforcing material which is knitted or made of a braided body, reduces the diameter thereof by the tensile force in the braiding process, and fastens a whole of the outer periphery including the ends of the expanded graphite tape, and which has been subjected to the twisting process. Therefore, the reinforcing material can protect the ends of the expanded graphite tape in the braiding process, prevent the frequent occurrence of the cracks in the ends of the expanded graphite tape and prevent many expanded graphite particles from being exfoliated resultantly. Moreover, the prevention of exfoliation and the reinforcing effect of the reinforcing material make it possible to braid it by means of the strong tensile force, thereby enhancing the pressure resistance property of the gland packing.

Moreover, according to the second aspect of the present invention having the above structure, the expanded graphite tape is bound and covered with the reinforcing material which is knitted or made of a braided body, before it is subjected to the braiding process. Consequently, even if the expanded graphite tape is only subjected to the light twisting process, there is no possibility of causing a state wherein, in the braiding process, the expanded graphite tape which has been subjected to the twisting process is not tightly bound with the reinforcing material with the result that the cracks which occur from the ends of the expanded graphite tape and the resultant exfoliation of the expanded graphite particles are increased.

According to the first and second aspects of the present invention, a configuration wherein reinforcing fibers are embedded in the expanded graphite tape in a longitudinal direction of the tape is used, thereby improving the tensile strength and twisting strength of the expanded graphite tape. As a result, the knitting yarn can be braided by the great tensile force.

Moreover, in the first and second aspects of the present invention, it is preferable to employ a configuration wherein the expanded graphite particles on a surface of the expanded graphite tape are partially removed. In other words, the expanded graphite particles on a side of the surface of the expanded graphite tape, where cracks easily occur, each of which is in a high density and high orientation state, are partially removed by a blast process. As a result, even if the great tensile force is applied to the expanded graphite tape in braiding the yarns, this can reduce further surely the occurrence of the cracks and the resultant exfoliation of the expanded graphite particles.

In the second aspect of the present invention, preferably, the reinforcing material binds and covers the expanded graphite tape, so that the expanded graphite tape which has been subjected to the twisting process may be deformed so as to reduce the diameter thereof As the reinforcing material according to the first and second aspects of the present invention, any one of metallic line members such as stainless steel, Inconel, and monel metal; organic fibers such as a cotton fiber, a rayon fiber, a phenol fiber, an aramid fiber, a PBI fiber, a PBO fiber, a PPS fiber, and a PEEK fiber; or inorganic fibers such as a glass fiber, a carbon fiber, and a ceramic fiber may be selected and used.

As the reinforcing fibers in the first and second aspects of the present invention, any one selected from organic fibers such as a cotton fiber, a rayon fiber, a phenol fiber, an aramid fiber, a PBI fiber, a PBO fiber, a PPS fiber, and a PEEK fiber; any one selected from inorganic fibers such as a glass fiber, a carbon fiber, and a ceramic fiber; or any one selected form metallic line members such as stainless steel, Inconel and monel metal may be used; or at least two materials selected from the organic fibers, the inorganic fibers, and the metallic line members may be complex-used.

A gland packing according to a third aspect of the present invention is made of expanded graphite knitting yarns, and is characterized in that the plural expanded graphite knitting yarns are put together and subjected to either braiding or twisting process, each expanded graphite knitting yarn being formed by applying a twisting process to an expanded graphite tape, and an outer periphery of the expanded graphite tape, which has been subjected to the twisting process, being covered with a reinforcing material which is knitted or made of a braided body.

A gland packing according to a fourth aspect of the present invention is made of expanded graphite knitting yarns, and characterized in that the plural expanded graphite knitting yarns are put together and subjected to either braiding or twisting process, each expanded graphite knitting yarn being formed by applying the twisting process to an expanded graphite tape, an outer periphery of the expanded graphite tape which has been subjected to the twisting process being bound and covered with a reinforcing material which is knitted or made of a braided body, before the tape is subjected to the braiding process.

According to the third and fourth aspects of the present invention having the above configuration, the knitting yams for a gland packing has the following features wherein the cracks which occur from the ends of the expanded graphite tape and the resultant exfoliation thereof are extremely reduced in the braiding process as well as the twisting process, and wherein plural knitting yams which are braided or twisted by the strong tensile force are employed, put together, and either braided or twisted. This can provide a gland packing having an excellent sealing property and a high pressure resistance property.

In the third and fourth aspects of the present invention, as a matter of course, it is preferable to employ a configuration wherein reinforcing fibers are embedded in the expanded graphite tape which forms the expanded graphite knitting yam, in a longitudinal direction of the tape, and a configuration wherein expanded graphite particles on a surface of the expanded graphite tape which forms the expanded graphite knitting yam, are partially removed.

BRIEF DESCRIPTION OF THE DRAWINGS

FIG. 3 is a perspective view illustrating another embodiment of the expanded graphite knitting yam according to the first and second aspects of the present invention.

FIG. 4 is a perspective view illustrating still another embodiment of the expanded graphite knitting yarn according to the first and second aspects of the present invention.

FIG. 5 is a perspective view illustrating an embodiment of a gland packing according to a third and fourth aspect of the present invention.

FIG. 6 is a perspective view illustrating another embodiment of the gland packing according to the third and fourth aspects of the present invention.

DETAILED DESCRIPTION OF THE PREFERRED EMBODIMENT

Hereinafter, an embodiment of the invention will be described with reference to the drawings.

Figure 1:
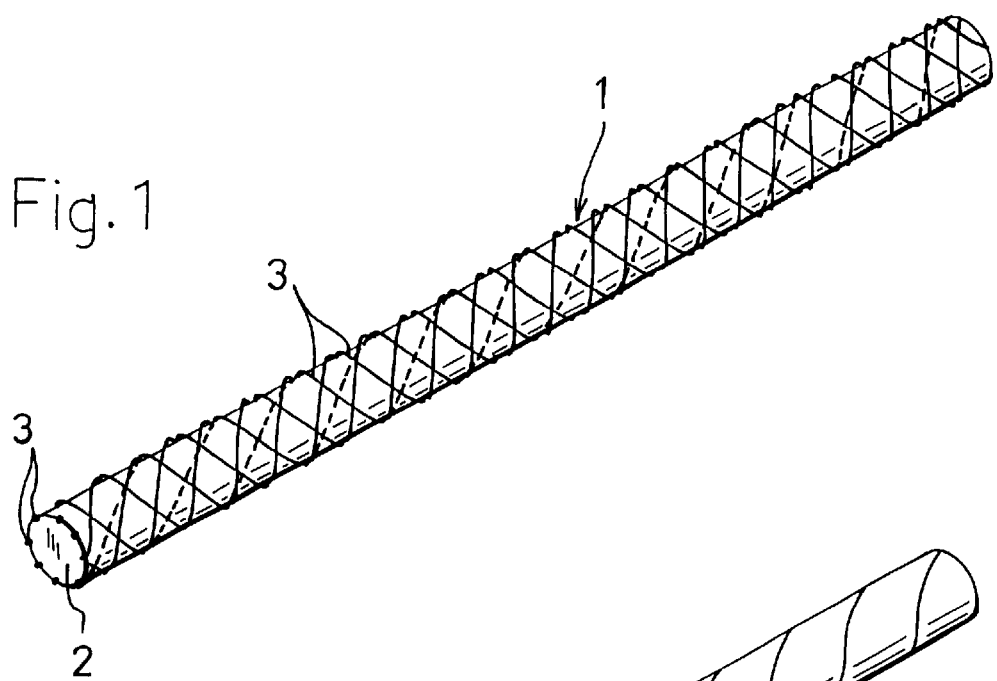
FIG. 1 is a perspective view illustrating an embodiment of an expanded graphite knitting yam according to a first aspect of the present invention.

FIG. 1 is a perspective view illustrating an embodiment of an expanded graphite knitting yarn according to a first aspect of the present invention. In FIG. 1, an expanded graphite knitting yarn 1 includes an expanded graphite tape 2 having a predetermined width, which has been subjected to a twisting process, and a reinforcing material 3. In order to prevent the expanded graphite tape 2 from expanding and returning to an original state, an outer periphery of the expanded graphite tape 2 having a predetermined width, which has been subjected to the twisting process, is covered with the reinforcing material 3 made of a braided body such as stainless steel line members.

Figure 2A:
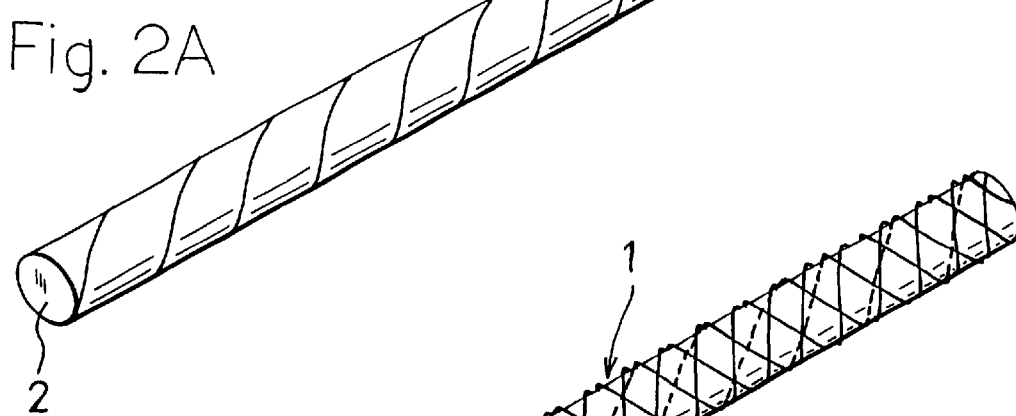
FIGS. 2A and 2B are perspective views illustrating an embodiment of the expanded graphite knitting yam according to a second aspect of the present invention.
Figure 2B:
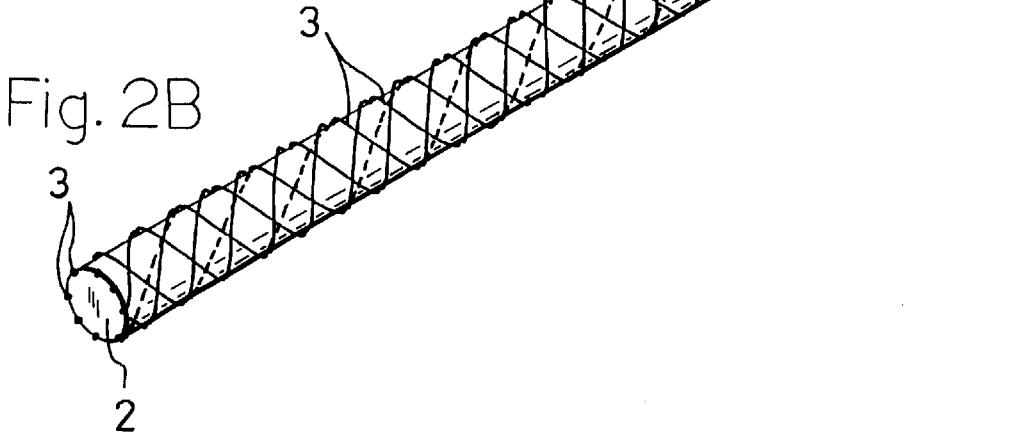
Figure 7:
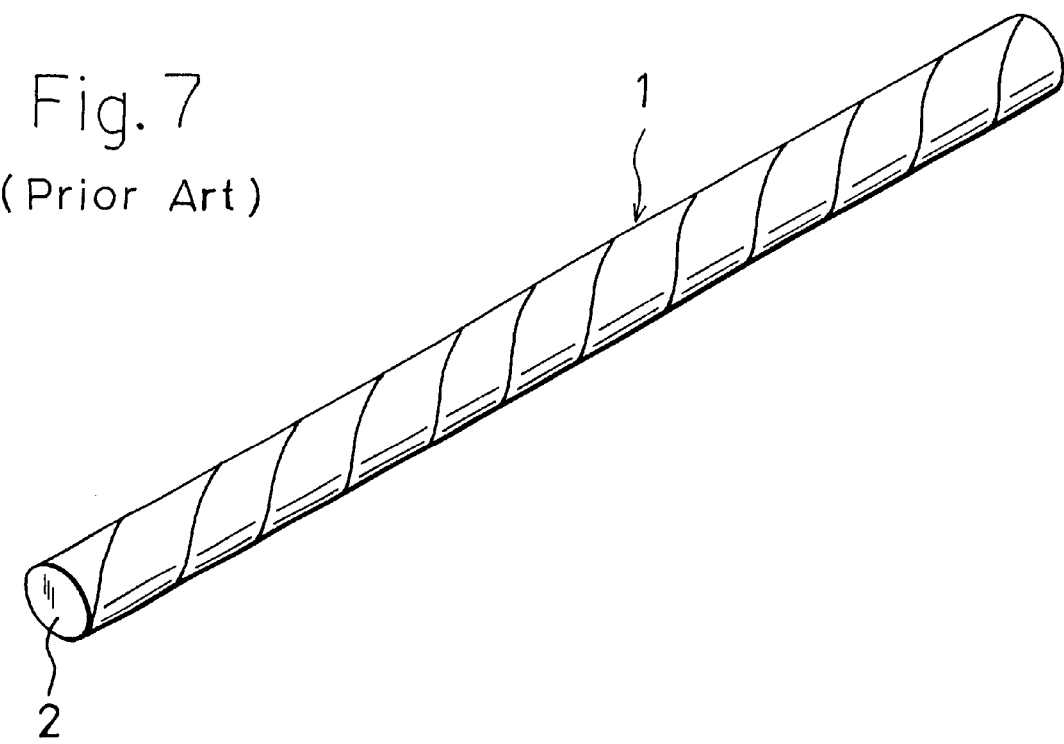
FIG. 7 is a perspective view illustrating a conventional expanded graphite knitting yarn.
Figure 8:
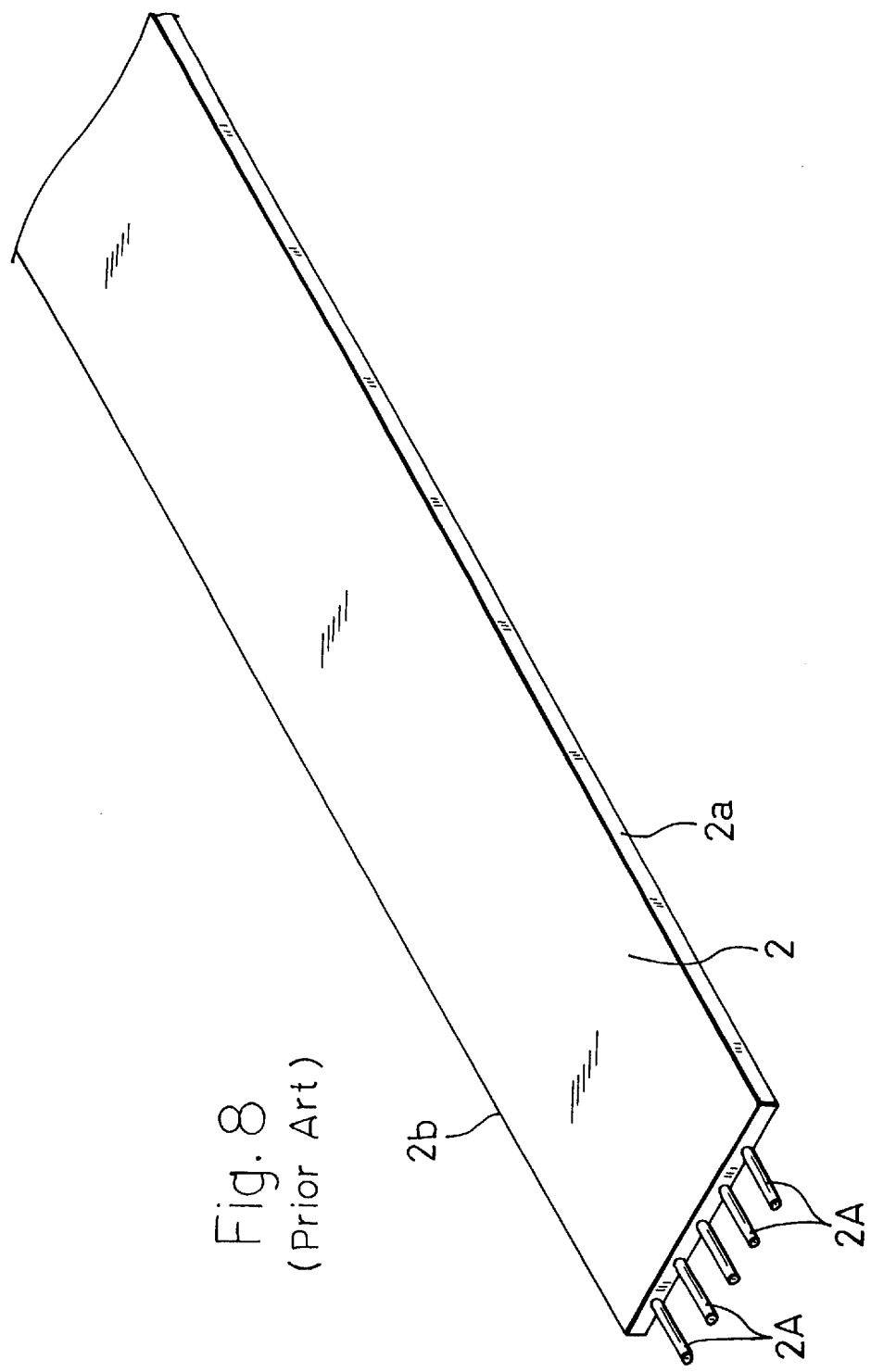
FIG. 8 is a perspective view illustrating a conventional expanded graphite knitting yarn which has not yet been subjected to a twisting process.

FIGS. 2A and 2B are perspective views illustrating one embodiment of an expanded graphite knitting yarn according to a second aspect of the present invention. Before a process wherein the outer periphery of the expanded graphite tape 2 which has been subjected to the twisting process is braided, as shown in FIG. 2A, the expanded graphite knitting yarn 1 is tightly bound with the reinforcing material 3 made of a braided material such as stainless steel line members, (for example, to the extent that the expanded graphite tape 2 which has been subjected to the twisting process is deformed so as to reduce the diameter therof) as shown in FIG. 2B.

A material of the reinforcing material 3 in the expanded graphite knitting yarn 1 shown in FIGS. 1 and 2, may be selected from among metallic line members such as Inconel, and monel metal; organic fibers such as a cotton fiber, a rayon fiber, a phenol fiber, an aramid fiber, a PBI fiber, a PBO fiber, a PTEF fiber, a PPS fiber, and a PEEK fiber; or inorganic fibers such as a carbon fiber, and a ceramic fiber, though stainless steel line members are used in the embodiments. Moreover, the reinforcing material 3 may be knitted.

FIG. 3 is a perspective view illustrating another embodiment of the expansive graphite knitting yarn 1 according to the first and second aspects of the present invention. A difference between the expanded graphite knitting yarn 1 in FIG. 3 and that in FIGS. 1 and 2 is that, in FIG. 3, plural reinforcing fibers 2A are longitudinally embedded in the expanded graphite tape 2 so as to leave a space thereby in the width direction of the expanded graphite tape 2.

As the reinforcing fibers 2A, any one material selected from organic fibers such as a cotton fiber, a rayon fiber, a phenol fiber, an aramid fiber, a PBI fiber, a PBO fiber, a PTFE fiber, a PPS fiber, and a PEEK fiber; any one material selected from inorganic fibers such as a glass fiber, a carbon fiber, and a ceramic fiber; or any one material selected from metallic line members such as stainless steel, Inconel, and monel metal is selected. As a matter of course, at least two materials appropriately selected from among the organic fibers, the inorganic fibers, and the metallic line members may be complex-used.

FIG. 4 is a perspective view illustrating still another embodiment of the expansive graphite knitting yarn 1 according to the first and second aspects of the present invention. A difference between the expanded graphite knitting yarn 1 in FIG. 4 and those of the embodiments shown in FIGS. 1 and 2 is that, in FIG. 4, the expanded graphite particles on a side of the surface of the expanded graphite tape 2, each of which is in a high density and high orientation state, are partially removed by a blast process.

In detail, the expanded graphite particles on the surface of the expanded graphite tape 2, each of which is in a high density and high orientation state, are removed by a micro blasting process which uses particles having each smaller particle diameter than that of the each expanded graphite particle. Concretely, for example, from a position located 150 mm apart from the outer surface of the expanded graphite tape 2, fine grains (for example, having each particle diameter of 15 μm) such as SiC are blasted by an air pressure of 2 kg/cm$^2$. Thus, the micro blast process is applied thereto, whereby the expanded graphite particles where cracks are easily caused and grown are removed from the surface 5 of the expanded graphite tape 2. Though an exfoliation resistance strength of the expanded graphite particles which have not yet been subjected to the blasting process is within a range of 30 to 40 g, the exfoliation resistance strength thereof can be increased to be within a range of 140 to 150 g by means of applying the blast process thereto.

The blast process may be applied to the surface of the expanded graphite tape 2 of the expanded graphite knitting yarn 1 according to the embodiment shown in FIG. 4.

The plural expanded graphite knitting yarns 1 according to the each above embodiment are prepared, and the plural expanded graphite knitting yarns 1 are put together and braided by a braiding machine, thereby forming a gland packing 6 which is string-shaped, as shown in FIG. 5. Moreover, the plural expanded graphite knitting yarns 1 according to each embodiment may be put together and subjected to the twisting process, thereby forming a gland packing 6 which is string-shaped, as shown in FIG. 6.

The entire disclosure of Japanese Patent Application No. 11-316517 filed on Nov. 11, 1999 including specification, claims, drawings and summary and incorporated herein by reference in its entirety.

What is claimed is:

1. An expanded graphite knitting yarn formed by applying a twisting process to an expanded graphite tape, characterized in that a whole of an outer periphery of the expanded graphite tape including ends thereof, which has been subjected to the twisting process, is covered with a reinforcing material which is knitted or made of a braided body.

2. An expanded graphite knitting yarn according to claim 1, wherein the reinforcing material is selected and used from among metallic line members such as stainless steel, Inconel, and monel metal; organic fibers such as a cotton fiber, a rayon fiber, a phenol fiber, an aramid fiber, a PBI fiber, a PBO fiber, a PPS fiber, and a PEEK fiber; or inorganic fibers such as a glass fiber, a carbon fiber, and a ceramic fiber.

3. An expanded graphite knitting yarn according to claim 1, wherein reinforcing fibers are embedded in the expanded graphite tape in a longitudinal direction of the tape.

4. An expanded graphite knitting yarn according to claim 3, wherein, as the reinforcing fibers, any one selected from organic fibers such as a cotton fiber, a rayon fiber, a phenol fiber, an aramid fiber, a PBI fiber, a PBO fiber, a PPS fiber, and a PEEK fiber; any one selected from inorganic fibers such as a glass fiber, a carbon fiber, and a ceramic fiber; or any one selected from metallic line members such as stainless steel, Inconel, and monel metal is used; or at least two materials selected from the organic fibers, the inorganic fibers, and the metallic line members are complex-used.

5. An expanded graphite knitting yarn according to claim 1, wherein expanded graphite particles on a surface of the expanded graphite tape are partially removed.

6. An expanded graphite knitting yarn formed by applying a twisting process to an expanded graphite tape, characterized in that a whole of an outer periphery of the expanded graphite tape including ends thereof, which has been subjected to the twisting process, is bound and covered with a reinforcing material which is knitted or made of a braided body, before the tape is subjected to a braiding process.

7. An expanded graphite knitting yarn according to claim 6, wherein the reinforcing material is selected and used from among metallic line members such as stainless steel, Inconel, and monel metal; organic fibers such as a cotton fiber, a rayon fiber, a phenol fiber, an aramid fiber, a PBI fiber, a PBO fiber, a PPS fiber, and a PEEK fiber; or inorganic fibers such as a glass fiber, a carbon fiber, and a ceramic fiber.

8. An expanded graphite knitting yarn according to claim 6, wherein the reinforcing material binds and covers the expanded graphite, so that the expanded graphite which has been subjected to the twisting process may be deformed so as to reduce the diameter thereof.

9. An expanded graphite knitting yarn according to claim 6, wherein reinforcing fibers are embedded in the expanded graphite tape in a longitudinal direction of the tape.

10. An expanded graphite knitting yarn according to claim 6, wherein expanded graphite particles on a surface of the expanded graphite tape are partially removed.

11. An expanded graphite knitting yarn according to claim 9, wherein, as the reinforcing fibers, any one selected from organic fibers such as a cotton fiber, a rayon fiber, a phenol fiber, an aramid fiber, a PBI fiber, a PBO fiber, a PPS fiber, and a PEEK fiber; any one selected from inorganic fibers such as a glass fiber, a carbon fiber, and a ceramic fiber; or any one selected from metallic line members such as stainless steel, Inconel, and monel metal is used; or at least two materials selected from the organic fibers, the inorganic fibers, and the metallic line members are complex-used.

12. A gland packing made of expanded graphite knitting yarns, characterized in that the plural expanded graphite knitting yarns are put together and subjected to either braiding or twisting process, each expanded graphite knitting yarn being formed by applying a twisting process to an expanded graphite tape, and a whole of an outer periphery of the expanded graphite tape including ends thereof, which has been subjected to the twisting process, being covered with a reinforcing material which is knitted or made of a braided body.

13. A gland packing according to claim 12, wherein reinforcing fibers are embedded in the expanded graphite tape which forms the expanded graphite knitting yarn, in a longitudinal direction of the tape.

14. A gland packing according to claim 12, wherein expanded graphite particles on a surface of the expanded graphite tape which forms the expanded graphite knitting yarn, are partially removed.

15. A gland packing made of expanded graphite knitting yarns, characterized in that the plural expanded graphite knitting yarns are put together and subjected to either braiding or twisting process, each expanded graphite knitting yarn being formed by applying a twisting process to an expanded graphite tape, and a whole of an outer periphery of the expanded graphite tape including ends thereof, which has been subjected to the twisting process, being bound and covered with a reinforcing material which is knitted or made of a braided body, before the tape is subjected to the braiding process.

16. A gland packing according to claim 15, wherein reinforcing fibers are embedded in the expanded graphite tape which forms the expanded graphite knitting yarn, in a longitudinal direction of the tape.

17. A gland packing according to claim 15, wherein expanded graphite particles on a surface of the expanded graphite tape which forms the expanded graphite knitting yarn, are partially removed.

* * * * *